United States Patent [19]
Reed et al.

[11] Patent Number: 6,055,261
[45] Date of Patent: *Apr. 25, 2000

[54] ULTRAFAST LASER WITH MULTIPLY-FOLDED RESONANT CAVITY

[75] Inventors: Murray Keith Reed, Menlo Park; John Roderick Lincoln, Mountain View, both of Calif.

[73] Assignee: Coherent, Inc., Santa Clara, Calif.

[ * ] Notice: This patent is subject to a terminal disclaimer.

[21] Appl. No.: 09/246,415

[22] Filed: Feb. 8, 1999

Related U.S. Application Data

[63] Continuation of application No. 08/858,494, May 19, 1997, Pat. No. 5,912,915.

[51] Int. Cl.[7] .................................................. H01S 3/081
[52] U.S. Cl. ............................................. 372/93; 372/99
[58] Field of Search ...................... 372/92–94, 98, 372/99, 107, 108

[56] References Cited

U.S. PATENT DOCUMENTS

| Re. 32,849 | 1/1989 | Wei et al. | 204/192.27 |
|---|---|---|---|
| 5,007,059 | 4/1991 | Keller et al. | 372/99 X |
| 5,067,134 | 11/1991 | Oomen | 372/6 |
| 5,068,749 | 11/1991 | Patel | 359/93 |
| 5,098,189 | 3/1992 | von Bieren | 356/350 |
| 5,596,404 | 1/1997 | Beck et al. | 356/301 |
| 5,734,503 | 3/1998 | Szipócg et al. | 359/584 |

OTHER PUBLICATIONS

R. Szipöce & K. Ferencz, "Chirped multilayer coatings for broadband dispersion control in femtosecond lasers," *Optics Letters*, vol. 19, No. 3, Feb. 1, 1994, pp. 201–203.

J.M. Jacobson, K. Naganuma, H.A. Haus & J.G. Fujimoto, "femtosecond pulse generatiuon in a Rt:Al$_2$O$_3$ laser by using second–and third–order intracavity dispersion," *Optics Letters*, vol. 17, No. 22, Nov. 15, 1992, pp. 1608–1610.

J. Kuhl & J. Heppner, "Compression of Femtosecond Optical Pulses with Dielectric mulitlayer Interferometers," *IEEE Transactions on Quantum Electronics*, vol. QE–22, No. 1, Jan. 1986, pp. 182–185.

K.D. Li, W.H. Knox & N.M. Pearson, "Broadband cubic–phase compensation with resonant Gires–Tournois inerferometers," *Optics Letters*, vol. 14, No. 9, May 1, 1989, pp. 450–452.

A. Stingl, M. Lenzer, Ch. Spielmann & F. Krausz, "Sub–10–fs mirror–dispersion–controlled Ti:sapphire laser," *Optics Letters*, vol. 20, No. 6, Mar. 15, 1995, pp. 602–604.

(List continued on next page.)

*Primary Examiner*—John D. Lee
*Attorney, Agent, or Firm*—Limbach & Limbach L.L.P.

[57] ABSTRACT

An ultrafast laser providing short output pulses having a pulse length in the femtosecond range includes a resonant cavity including a plurality folding mirrors for folding the resonant cavity to shorten its overall length. The fold-mirrors each include a plurality of layers deposited by ion-beam sputtering onto a substrate having a surface roughness of less than about 0.5 nanometers RMS. One or more of the folding mirrors may have a negative-group-velocity-dispersion mirror for allowing the laser to operate in a pulsed mode with pulses having a length of less than 500 femtoseconds.

2 Claims, 4 Drawing Sheets

OTHER PUBLICATIONS

W. Zhao & E. Bourkoff, "Compression of nonlinearly chirped pulses Gires–Tournois interferometers," *Appl. Phys. Lett.,* vol. 50, No. 19, May 11, 1987, pp. 1304–1306.

C. Spielmann, P.F. Curley, T. Brabec & F. Krausz, "Ultrabroadband Femtosecond Lasers," *IEEE Journal on Quantum Electronis,* vol. 30, No. 4, Apr. 1994, pp. 1100–1114.

International Search Report for PCT Application No. PCT/US98/05284, mailed Jun. 18, 1998,, 7 pages in length.

I.T. Sorokina, E. Sorokin & E. Wintner, "Prismless passively mode–locked femtosecond CR:liSGaF laser," *Optics Letters,* vol. 21, No. 15, Aug. 1, 1996, pp. 1165–1167.

J.M. Jocobson, K. Naganuma, H.A. Haus & J.G. Fujimoto, "Femtosecond pulse generation in a Ti:$Al_2O_3$ laser by using second–and third–order intracavity dispersion," *Optics Letters,* vol. 17, No. 22, Nov. 15, 1992, pp. 1608–1610.

A. Stingl, C. Spielmann & F. Kraucz, "Generation of 11–fs pulses from a Ti:sapphire laser without the use of prisms," *Optics Letters,* vol. 19, No. 3, Feb. 1, 1994, pp. 204–206.

ULTRAFAST LASER WITH MULTIPLY-FOLDED RESONANT CAVITY

This is a continuation of application Ser. No. 08/858,494, filed May 19, 1997 (now U.S. Pat. No. 5,912,915).

TECHNICAL FIELD OF THE INVENTION

The present invention relates in general to lasers which provide ultrafast (ultrashort) pulses having a width of about 500 femtoseconds (fs) or less. The invention relates in particular to a laser having a resonant cavity containing at least one pair of fold-mirrors having a peak-reflectivity greater than 99.97 percent and arranged to cause multiple reflections therebetween of laser-light circulating in the resonant cavity.

DISCUSSION OF BACKGROUND ART

Ultrafast lasers generate a series of short optical pulses. Temporal separation of the pulses is determined by a round-trip time of light circulating in the resonant cavity of the laser. The inverse of this pulse separation is general termed the laser frequency (F) and is given by an equation:

$$F = c/L_{roundtrip} = c/2L_{cavity} \tag{1}$$

where c is the speed of light in air $L_{cavity}$ is the actual linear length of the cavity. By way of example for a laser having a two meters (2 m) long linear cavity, i.e, a cavity with a 4 m round-trip length $L_{roundtrip}$, F is about seventy-five megahertz (75 MHz).

A passively mode-locked, ultrafast laser, for example, a Kerr-lens mode-locked titanium-doped sapphire (Ti:sapphire) laser, is not limited in terms of a round-trip time, i.e, a frequency at which it can be operated. For a certain average output power, the energy per pulse and the pulse separation is directly proportional to the length of the laser's resonant cavity. As such, if a high energy per pulse or high pulse-separation time is required, it is desirable to operate the laser with as long a resonant cavity as possible.

Unfortunately, in many applications of ultrafast lasers, such as incorporating the laser in a small instrument, a laser having a cavity length of about 2 m or more is simply not practical. A practical length is about thirty centimeters (cm) or less. In certain applications a length of 10 cm may be desirable. To "fold" a 2 m long cavity, using multiple reflections, to obtain a 10 cm longest physical dimension would require more than twenty reflections, i.e., more than forty reflections per round trip in the cavity. Commercially available laser reflectors are typically vacuum deposited by thermal evaporation of layer-forming materials. Such mirrors typically have a maximum reflection of about 99.8%, or, where special precautions are taken to reduce loss, of about 99.9%.

In most ultrafast lasers, a cavity loss in excess of 1.0% would lead to significant loss of output power. For example, in an ultrafast laser having 10% outcoupling a 1% cavity loss (per round trip) equates to about 10% loss of output power. Because of this, even if 99.9% reflecting fold-mirrors were used, more than about ten intra-cavity reflections therefrom, per round-trip, would produce significant output power reduction.

Further, in order to support the ultrashort pulse length characteristic of an ultrafast laser the laser must possess a total negative group velocity dispersion, (negative GVD or NGVD) i.e., the sum of the GVD of the laser gain medium and all cavity components must be negative. In a simple arrangement of a laser cavity and dielectric material therein, such as, a gain medium and a mode locking device, total cavity GVD would be positive, i.e., shorter wavelength light experiences a higher refractive index and lower group velocity and lags behind longer wavelength light. This causes lengthening of a laser pulse each round trip and prevents stable, short-pulse operation. One means of avoiding this, is to include one or more NGVD devices having collective negative GVD at least equal to and preferably greater than this positive GVD. Furthermore if the laser is to be tunable over a range of wavelengths, the NGVD devices must be effective over that range of wavelengths.

Reflective NGVD devices which have been used with prior art ultrafast lasers include Gires-Tournois Interferometer (GTI) mirrors, and so called "chirped" mirrors, all of which are multilayer dielectric interference layer structures, typically vacuum deposited by thermal evaporation of materials from electron-beam heated, or resistance-heated sources. Reflective NGVD devices are referred to hereinafter as NGVD-mirrors.

A GTI mirror is a multilayer NGVD-mirror including a reflector, comprising a stack of alternating high and low refractive index dielectric layers, each layer having a thickness of one-quarter wavelength at the nominal operating wavelength of the laser, and a single thick "spacer" layer (typically may wavelengths thick) of a dielectric material deposited on the reflector. A partially reflecting multilayer stack may (optionally) be deposited on the spacer layer. A GTI-mirror typically gives a constant negative GVD over only a relatively narrow wavelength range, for example about fifty nanometers (nm).

A so-called chirped mirror is a multilayer stack alternating high and low refractive index dielectric layers, the layers being varied in thickness throughout the stack, to different degrees, about a nominal quarter-wavelength optical thickness at a nominal laser wavelength. This type of mirror may also be termed a simply a negative dispersion mirror (NDM), a term which is hereinafter used to describe any NGVD-mirror structure which is not a GTI-mirror. Such a mirror can provide constant NGVD over a broader band of wavelengths than a GTI mirror, for example, up to about 200 nm with the same GVD. Such a NDM may include as many as forty-five or more layers.

A common goal of all NGVD-mirrors, however designed and named, is to cause longer wavelengths in a given pulse, i.e., in the bandwidth of the pulse, to take a longer time to be reflected than shorter wavelengths in that pulse. This is achieved, in a NDM, primarily by the large total thickness of the multilayer structure. This total thickness may be three or more times the thickness required to provide a simple 99.8% reflecting multilayer mirror. In a GTI-mirror this is achieved by resonant behavior of electric fields in the spacer layer. This resonant behavior exacerbates any inherent losses in the spacer layer.

Either because of a greater total thickness (NDMs) or resonances (GTI-mirrors) more optical losses (scatter and absorption) are generally experienced in prior-art NGVD-mirrors than in simple fold-mirrors. This is one reason why GTI-mirrors and NDMs have been used only to a limited extent in prior art ultrafast lasers. An ability to provide multiple reflections from a negative-dispersion mirror within a resonant cavity is advantageous in designing such a mirror to be effective over a broad band of wavelengths.

SUMMARY OF THE INVENTION

The present invention is directed to providing an ultrafast laser having a long resonant cavity for providing a high pulse-energy but which occupies a physical space having a length significantly less, for example about an order of magnitude less, than the path-length of resonant cavity.

In one aspect, laser apparatus in accordance with the present invention, comprises first and second end mirrors forming a resonant cavity for laser-light. A laser gain medium is located in the resonant cavity.

Also included in the resonant cavity is a plurality of fold-mirrors. The fold-mirrors are cooperatively aligned with the first and second end mirrors such that laser-light circulating in the resonant cavity is reflected by the fold-mirrors in a zig-zag path therebetween. The fold-mirrors each have a peak reflectivity greater than 99.97%, and preferably have a peak reflectivity greater than 99.99%.

In another aspect of the present invention, one or more of the fold-mirrors may be a NGVD-mirror. Laser-light reflected from any one of the NGVD-mirrors is defined as having undergone a NGVD-reflection. Preferably, at least two of the fold-mirrors are NGVD-mirrors and are aligned with respect to each other such that laser-light following the zig-zag path undergoes at least eight NGVD-reflections in travelling from one end mirror to the other, i.e, at least sixteen NGVD-reflections per round-trip between the end mirrors. More preferably, the NGVD-mirrors are aligned such that the circulating laser-light undergoes at least sixteen NGVD-reflections per round-trip between the end mirrors. Providing a large number of negative-dispersion reflections per round trip provides that negative dispersion devices can be arranged to provide the resonant cavity with net negative GVD over a relatively broad range of wavelengths, since the magnitude of negative GVD is generally inversely related to the bandwidth of negative GVD.

Preferably, fold-mirrors, including NGVD-mirrors are formed from a plurality of layers of dielectric material deposited by ion-beam sputtering. The ion-beam-sputter-deposited layers are preferably deposited on a substrate having a surface micro-roughness less than about 0.5 nm RMS.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
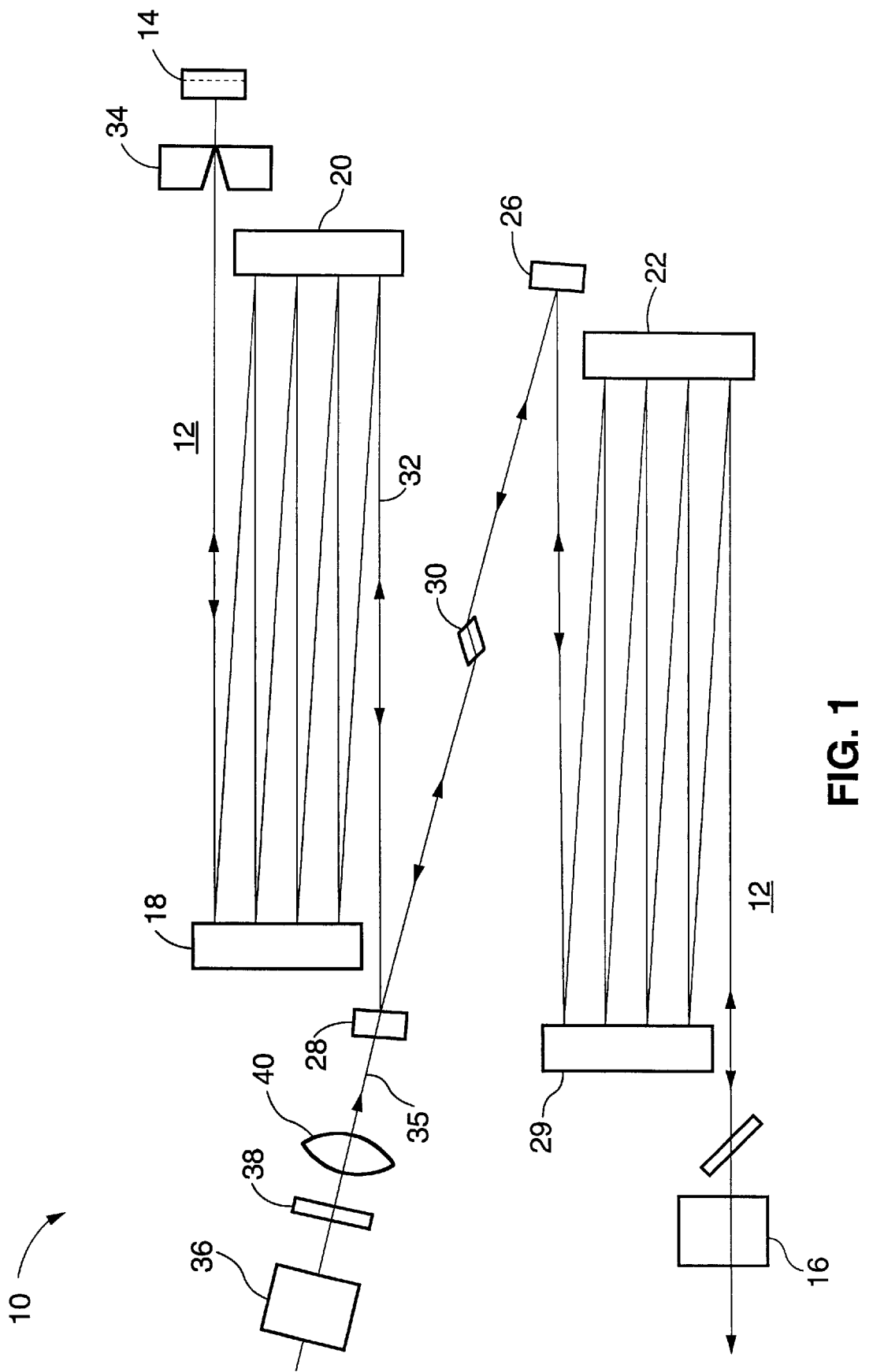
FIG. 1 is a plan view schematically illustrating one arrangement of laser apparatus in accordance with the present invention including a resonant cavity, and fold-mirrors for folding the resonant cavity to shorten overall length of the apparatus.

Turning now to the drawings, wherein like components are designated by like reference numerals, FIG. 1 schematically illustrates a laser apparatus 10 in accordance with the present invention. A folded resonator cavity 12 is terminated at opposite ends thereof by end-mirrors 14 and 16. Located within cavity 12 are four fold-mirrors 18, 20, 22 and 24, arranged in pairs, and two focussing mirrors 26 and 28. Between focussing mirrors 26 and 28 is a gain medium (crystal) 30. A slit 34 between fold-mirror 20 and end-mirror 14 is provided for forcing mode-locked operation of laser 10. Focussing mirrors 28 and 26 are concave mirrors preferably having the same focal length, and preferably being confocally arranged. With Crystal 30 is preferably located at a greater distance from focussing-mirror 28 than from focussing-mirror 26.

Either end mirror 14 or end-mirror 16 may be used an output-coupling mirror (outcoupler) for the cavity, with the other used as a maximum reflector. In FIG. 1, mirror 16 is depicted as the outcoupler and, as such is partially transmissive at the laser-light wavelength. End mirror 14 is maximally reflective at the laser-light wavelength. Laser light circulating in cavity 12 follows a zigzag path 32 between in proceeding from one end mirror to the other.

Fold-mirrors 18, 20, 22, and 24 each include a multilayer interference coating (not shown in FIG. 1) which provides a peak-reflectivity for laser-light equal to or greater than 99.97%, and preferably greater than 99.99%. The coating on any one of these fold mirrors may have a layer arrangement which provides above-discussed NGVD characteristics.

Focussing mirror 26 is preferably maximally reflective for the laser-light, preferably having a peak-reflectivity for the laser-light greater than 99.97% and more preferably greater than 99.99%. Focussing mirror 28 is preferably maximally reflective for laser-light, and maximally transmissive for pump-light 35. Pump-light 35 is used for exciting gain-crystal 30 and is preferably provided by a laser 36 via polarizing optics 38 and focussing optics 40. A filter element 42, for example, a birefringent filter, is included in cavity 12 for lasing wavelength selection or "tuning".

End mirrors 14 and 16, fold-mirrors 18, 20, 22, and 24, and focussing mirrors 26 and 28 are cooperatively aligned such that laser-light 32 circulating in resonant cavity 12 follows a zig-zag path between the fold-mirrors. This serves to greatly reduce the overall length of laser apparatus 10. Further, if any one of fold-mirrors 29 and 30 are negative dispersion mirrors, this provides that laser-light 32 may undergo multiple NGVD-reflections (one NGVD-reflection at each fold-reflection from a NGVD-mirror) in travelling from one end-mirror to the other. The ability to provide multiple NGVD-reflections greatly increases design flexibility for optical multilayer systems which are used to bestow the negative GVD reflection property, particularly for providing a wide wavelength range or band in which the mirrors have a constant negative GVD.

Apparatus 10 as illustrated in FIG. 1, provides sixteen fold-reflections in one pass or transit of laser-light from mirror 22 to mirror 24, i.e., thirty-two fold reflections per round trip from one mirror to the other and back. If all fold-mirrors 30 are NGVD-mirrors, this provides sixteen NGVD-reflections per pass, i.e., thirty-two NGVD-reflections per round trip. Cavity components are cooperatively aligned such that fold mirrors provide an equal number of fold-reflections between each end mirror and its corresponding (closest) focussing mirror. This makes the arrangement of cavity 12 essentially symmetrical. Symmetrical cavities are preferred for ultrafast laser systems.

It should be noted here that the symmetrical cavity arrangement of laser apparatus 12 is not essential in a laser apparatus in accordance with the present invention. Advantages of multiple fold-reflections or multiple NGVD-reflections may be obtained if such reflections take place only between fold mirrors located between one end-mirror and its corresponding focussing mirror, or in unequal numbers between fold mirrors located between both end mirrors and corresponding focussing mirrors.

It should also be noted that while eight fold-reflections or eight NGVD-reflections between an end mirror and its corresponding focussing mirror are illustrated in FIG. 1 as being provided by only two fold-mirrors, it will be evident to one skilled in the optical art, without further illustration, that, in theory at least, an equal number of such reflections may be provided by any number of mirrors from two to eight inclusive, suitably arranged and aligned, and could be used to provide an equivalent folding or an equivalent negative-GVD effect. It should also be noted that individual mirrors need not have the same negative GVD or be of the same type. Accordingly, it will be recognized that it is the number of fold-reflections or NGVD-reflections possible in apparatus in accordance with the present invention that differ it from prior-art ultrafast lasers, rather than the number of fold-mirrors, NGVD-mirrors or type thereof which are used to effect those reflections.

Simple fold-mirrors usually comprise only layers having an optical-thickness of about one-quarter wavelength at the wavelength at which peak reflectivity is desired (usually at the angle of incidence and for the particular polarization with which the mirror will be used). The term simple, here, infers that the mirrors are required only to have a high reflection for laser light, and are not required to have a particular GVD. Layer arrangements of such simple fold-mirrors are well-known in the art to which the present invention pertains. Accordingly, an illustration of such a layer arrangement is not provided herein.

As noted above, the magnitude of constant negative GVD possible in a NGVD-mirror is generally inversely related to the bandwidth of the negative-dispersion. By way of example, in GTI-mirror having a spacer layer of silicon dioxide ($SiO_2$), maximum GVD values of about −50 fs2 and −10 $fs^2$ equate to bandwidths (FWHM) of about 65 nm and 140 nm respectively at a peak-reflection wavelength (center-wavelength) of about 800 nm. A GVD of −70 $fs^2$ in a bandwidth of 100 nm has been reported for a prior-art NDM having the same center wavelength. A typical ultrafast laser cavity requires a total GVD of about −500 $fs^2$ per pass (−1000 $fs^2$ per round trip).

It is believed that NGVD-mirrors used in the present invention differ significantly in the manner of their manufacture from prior art NGVD-mirrors of design type, and, as result, are believed to have about two orders-of-magnitude less optical loss (scatter and absorption) than prior-art NGVD-mirrors. The significance of such greatly reduced optical loss is set forth below.

As discussed above, in a typical ultrafast laser cavity, optical gain is sufficiently low that an intracavity optical device having an optical loss greater than about $1 \times 10^{-2}$ would seriously degrade the laser performance. Thus for ten reflections from a reflecting device per round trip, any more than $1 \times 10^{-3}$ loss per reflection would seriously degrade the laser performance. In a multilayer dielectric mirror designed for maximum reflectivity, i.e., essentially zero transmission, an optical loss than $1 \times 10^{-3}$ per reflection would translate into a reflectivity of greater than 99.9%. Even with the most careful deposition practice, it is very difficult, using industry standard thermal-evaporation deposition techniques, to achieve a reflectivity significantly greater than 99.9%, if at all, even in a simple maximally reflecting end-mirror or fold-mirror having about seventeen layers. Increasing the number of layers in such a mirror to the quantity (or equivalent total thickness) necessary to construct a NGVD-mirror would cause an increase in loss generally proportional to the increased number of layers required.

This problem has been overcome in fold-mirrors and NGVD-mirrors in a laser in accordance with the present invention by depositing layers of the NGVD-mirrors by ion-beam sputtering. Lowest losses are achieved when layers of the NGVD-mirrors are deposited on a substrate which is polished to a surface micro-roughness of 0.5 nm RMS or less, preferably 0.3 nm RMS or less. End mirrors 14 and 16, and focussing mirrors 26 and 28 can be, and preferably are, deposited by the same process on similar substrates. In constructing NGVD-mirrors for use in a laser in accordance with the present invention, it has been found possible to deposit, by ion-beam sputtering, both GTI and NDM type NGVD-mirrors with optical losses lower than $1 \times 10^{-4}$ and as low as $3 \times 10^{-5}$. Simple fold-mirrors and cavity end mirrors with losses less than $1 \times 10^{-5}$ have been deposited.

Advantages to ultrafast lasers of being able to achieve such low loss in a fold-mirror or NGVD-mirror are numerous. A particular advantage is that, in a negative-dispersion mirror with $1 \times 10^{-5}$ loss, laser-light could undergo fifty or more negative-dispersion reflections per round-trip in a resonant cavity without creating a significant total cavity loss. This could be used to "fold" a 2 m long cavity into a physical space about 0.1 m long. Further, being able to achieve many intracavity NGVD-reflections provides that less negative dispersion per reflection is required. This offers the possibility that negative dispersion in an ultrafast-laser cavity can be achieved over a greater wavelength range than has been achieved in prior art ultrafast-laser cavity configurations.

Figure 2:
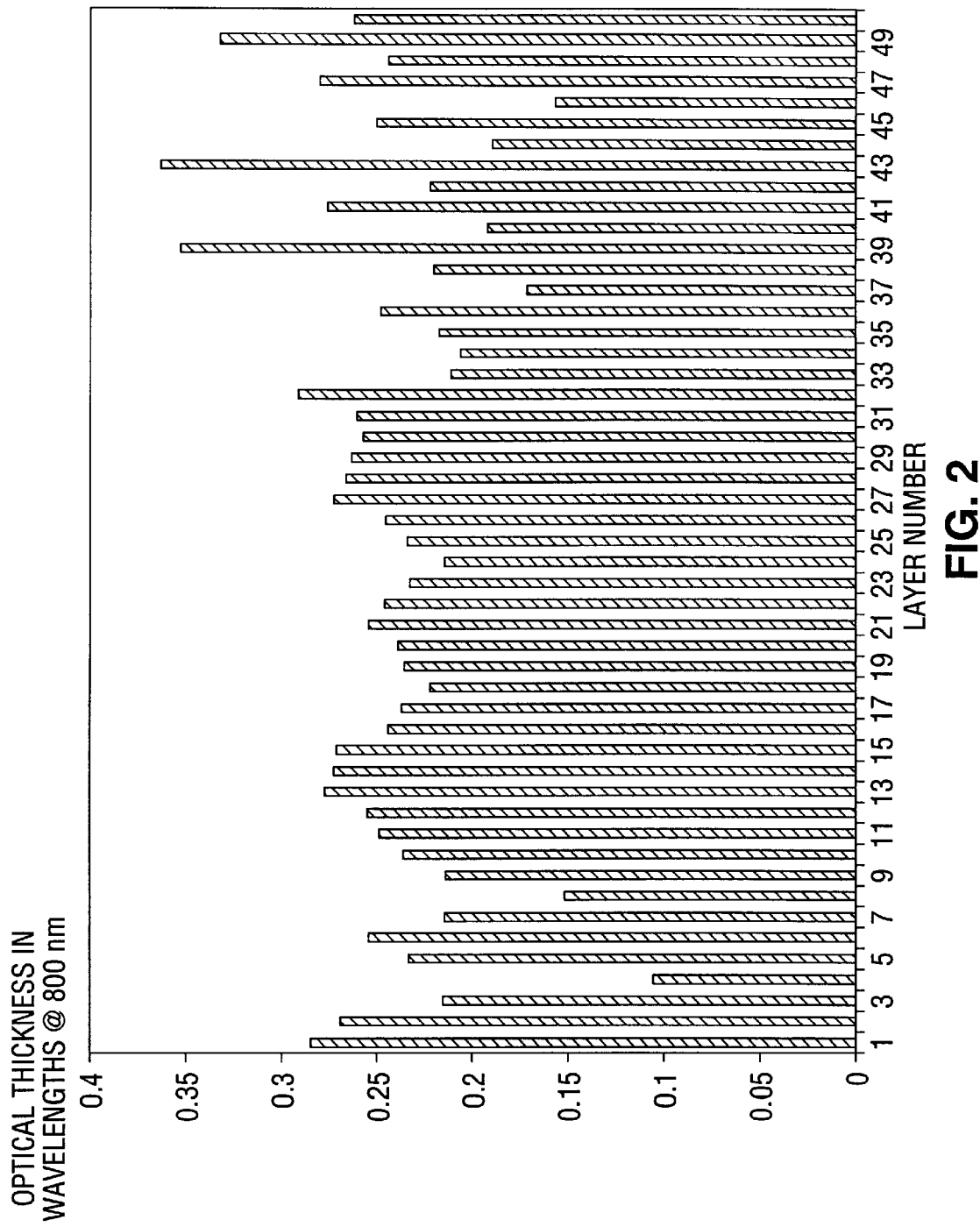
FIG. 2 is a graph schematically illustrating details of arrangement of layers in a fifty layer NDM mirror structure used for NGVD-mirrors in a laser in accordance with the arrangement of FIG. 1.

Referring now to FIG. 2, the thickness of layers in a fifty-layer, ion-beam-sputter-deposited, NDM is illustrated in graphical form. This mirror is designed to be used with a laser 10 in accordance with the present invention, tuneable in a wavelength range between about 770 and 830 nm. Layers are numbered beginning with the layer furthest from the substrate. Odd-numbered layers are high refractive index layers and are tantalum oxide ($Ta_2O_5$) layers. Even numbered layers are low refractive index layers and are layers of silicon dioxide ($SiO_2$). No layer in the design has an optical thickness which is greater than three-eighths of a wavelength at 800 nm or greater than one-half wavelength at any shorter wavelength in the desired tuning range of the laser.

Figure 3:
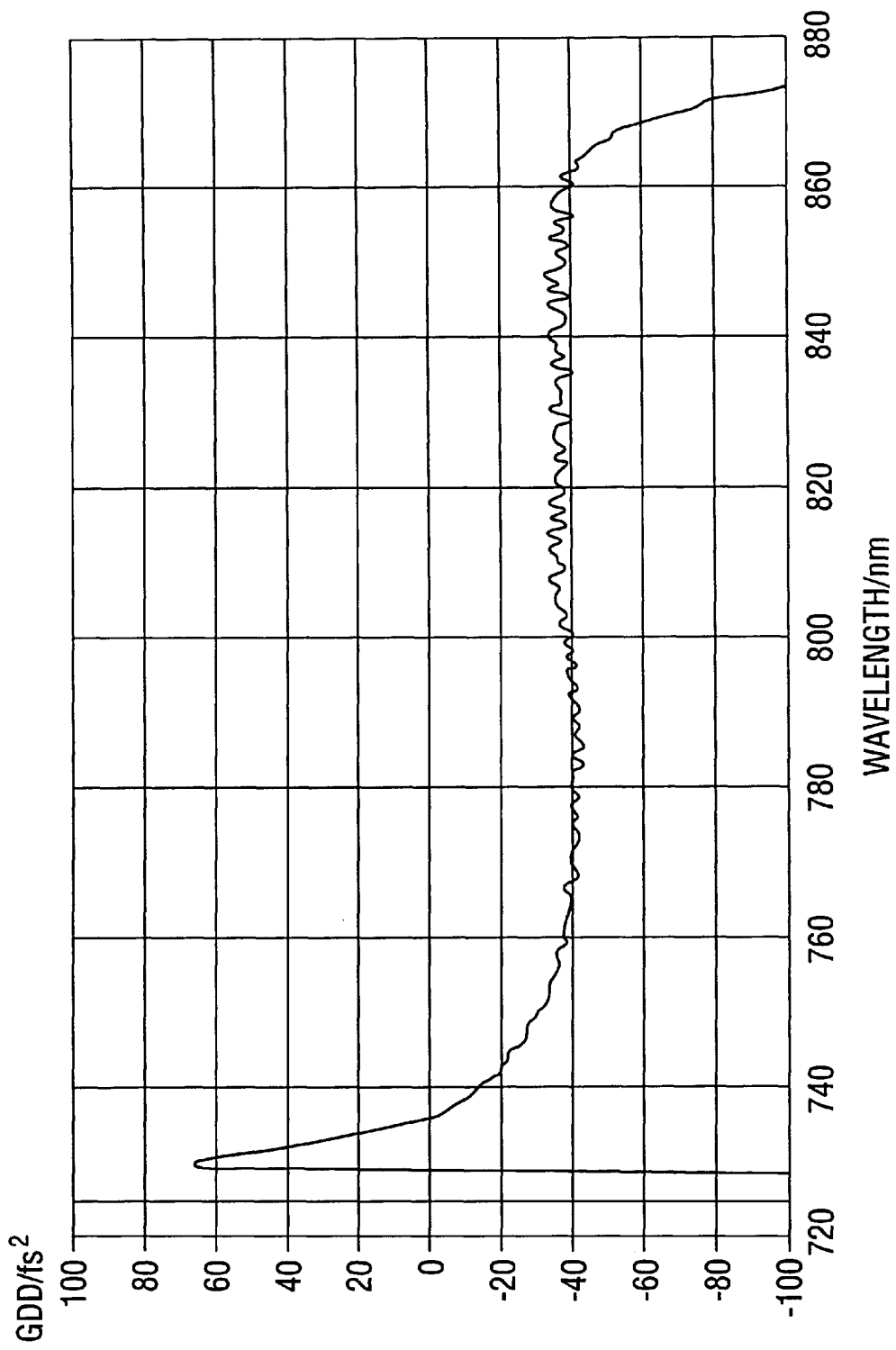
FIG. 3 is a graph schematically illustrating group dispersion delay as a function of wavelength for the NGVD mirror of FIG. 2.

In FIG. 3 is shown the group dispersion delay as function of wavelength for the mirror. It can be seen that this nominally about −39 $fs^2$ and is substantially constant, i.e, within about ±10%, over a range of about 100 nm.

Figure 4:
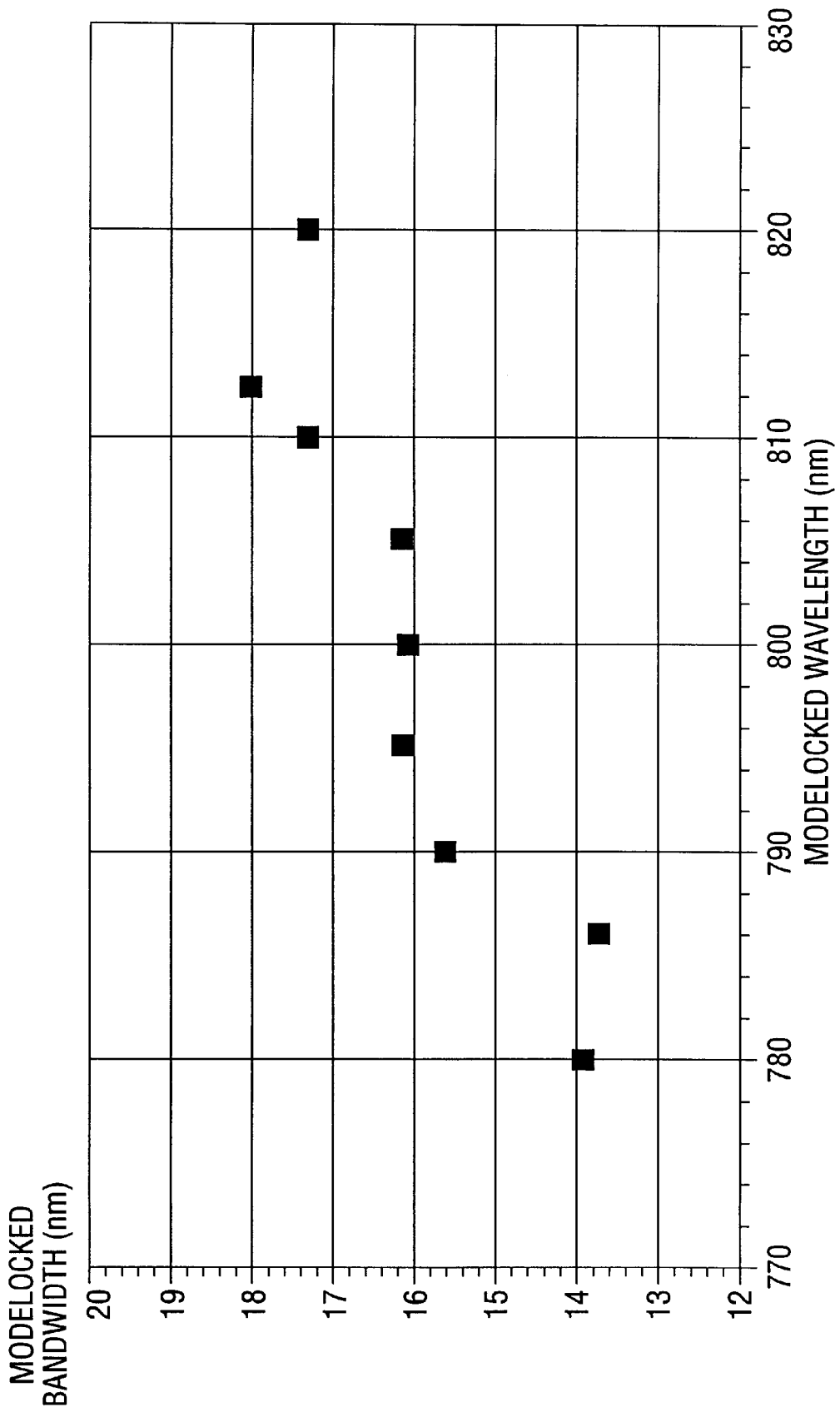
FIG. 4 is a graph schematically illustrating lasing wavelengths and corresponding bandwidths in a laser arrangement of FIG. 1 including two NGVD-mirrors having the layer arrangement of FIG. 2.

Table 1 shows pulse duration and bandwidth for mod-elocked pulses of 813 nm wavelength in a Ti:sapphire ultrafast laser generally in accordance with the arrangement of FIG. 1 wherein two, three, and four of fold mirrors 18, 20, 22 and 24 are ion-beam-sputter-deposited mirrors having the design of FIG. 4, deposited on substrates having a surface roughness of less than 0.3 nm RMS, and having measured peak reflectivity of 99.997 at about 800 nm. The reference numerals of the fold mirrors which are such NGVD-mirrors is given in the first column of the table.

In the tabulated arrangements, any fold-mirror which is not an NGVD mirror, as well as focussing mirrors 26 and 28 and that mirror which is used as a maximally reflective end-mirror also have a surface roughness less than about 0.3 nm RMS and have an ion-beam-sputtered coating providing a peak reflectivity of 99.997% or greater at 800 nm. The outcoupler has a transmission of about 10% at 800 nm. Focusing-mirrors 26 and 28 each have a radius of curvature of 100 mm, crystal 30 is located about 52.0 mm from mirror 28 and about 49.5 mm from mirror 26. Pump power was 2.0 Watts at a wavelength of 532 nm. Gain-medium (crystal) 30 is an uncoated 5.0 mm long Brewster rod of Ti(0.20%):$Al_2O_3$.

The total single-pass path-length for laser light, i.e., the true cavity length, is 1.875 m. Because of the multiply folded arrangement, all optical components of FIG. 1 with the exception of pump-laser 36 fit in a rectangle about 18 cm long and 9 cm wide.

TABLE 1

| NGVD Mirror Nos. | Pulse Duration (fs) | Pulse Bandwidth (nm) | Pulse Power (mW) |
|---|---|---|---|
| 22,24 | 42 | 26 | 230 |
| 22,24,18 | 44 | 21 | 260 |
| 22,24,20,18 | 58 | 17 | 340 |

In Table 1, the result using two or three NGVD mirrors was obtained whether end-mirror 14 or end-mirror 16 was used as an outcoupler. In the result using four NGVD mirrors, mirror 14 was used as the outcoupler. In FIG. 4, pulse bandwidth versus lasing wavelength for the arrangement in which four NGVD-mirrors are used is illustrated. The 42 fs pulses produced in the two NGVD-mirror arrangement are compressible, outside cavity 12, to less than 30 fs duration by using multiple reflections from additional NGVD-mirrors having the design of FIG. 2.

In summary, an ultrafast laser has been described which uses intracavity mirrors having a peak reflectivity of 99.97 or greater to multiply "fold" the a laser cavity. This provides a relatively long laser cavity, about two meters or more in length in a space having a length an order of magnitude or less than the cavity length.

The present invention has been described and depicted in terms of a preferred and other embodiments. The invention, however, is not limited to those embodiments described and depicted. Rather, the invention is defined by the claims appended hereto.

What is claimed is:

1. Laser apparatus for generating ultrashort pulses, comprising:

first and second end mirrors forming a resonant cavity for laser-light;

a laser gain medium located in said resonant cavity;

at least two fold-mirrors located in said resonant cavity, said fold mirrors being cooperatively aligned with said first and second end mirrors such that laser-light circulating in said resonant cavity, in travelling from one of said end mirrors to the other is reflected at least once by each of said fold-mirrors; and wherein at least one of said fold mirrors is an NGVD-mirror including a plurality of layers deposited by ion-beam sputtering and having a peak-reflectivity greater than 99.99%.

2. The laser apparatus of claim 1, wherein each of said at least two fold mirrors is an NGVD-mirror including a plurality of layers deposited by ion-beam sputtering and having a peak-reflectivity greater than 99.99%.

* * * * *